US006863023B2

(12) United States Patent
Burghardi et al.

(10) Patent No.: US 6,863,023 B2
(45) Date of Patent: *Mar. 8, 2005

(54) COMPUTER SYSTEM FOR DETERMINING A CUSTOMIZED ANIMAL FEED

(75) Inventors: Steve R. Burghardi, Eden Prairie, MN (US); Brian J. Knudson, Chanhassen, MN (US); Loren Peterson, Loretto, MN (US); David A. Cook, Coon Rapids, MN (US); Mark A. Oedekoven, Minneapolis, MN (US)

(73) Assignee: Can Technologies, Inc., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/715,053

(22) Filed: Nov. 17, 2003

(65) Prior Publication Data

US 2004/0098209 A1 May 20, 2004

Related U.S. Application Data

(63) Continuation of application No. 09/739,550, filed on Dec. 15, 2000, now Pat. No. 6,681,717.

(51) Int. Cl.⁷ .................................................. A01K 5/00
(52) U.S. Cl. ..................................................... 119/51.02
(58) Field of Search ............................. 119/51.02, 52.4, 119/53, 57.92; 702/19, 179, 181, 182, 183, 184

(56) References Cited

U.S. PATENT DOCUMENTS

| 4,493,290 A | 1/1985 | Gibbard |
| 4,498,424 A | 2/1985 | Leuschner |
| 4,517,923 A | 5/1985 | Palmer |
| 4,712,511 A | 12/1987 | Zamzow et al. |
| 5,105,767 A | 4/1992 | Gordon et al. |
| 5,174,244 A | 12/1992 | Gaalswyk |
| 5,355,833 A | 10/1994 | Legrain |
| 5,374,524 A | 12/1994 | Miller |
| 5,478,989 A | 12/1995 | Shepley |
| 5,636,118 A | 6/1997 | Brewster et al. |
| 5,668,718 A | 9/1997 | Liu et al. |
| 5,816,191 A | 10/1998 | Beaudoin et al. |
| 5,878,402 A | 3/1999 | Brewster et al. |
| 5,901,660 A | 5/1999 | Stein |
| 6,076,043 A | 6/2000 | Liu |
| 6,115,692 A | 9/2000 | Liu et al. |
| 6,135,055 A | 10/2000 | Pratt |

FOREIGN PATENT DOCUMENTS

| EP | 0 715 806 A1 | 6/1996 |
| HU | 209 360 A | 5/1994 |
| WO | WO 00/41575 | 7/2000 |
| WO | WO 01/89285 A2 | 11/2001 |
| WO | WO 02/02822 A2 | 1/2002 |

OTHER PUBLICATIONS

Novelty Search Report for Hungarian Application No. P0302586, Hungarian Patent Office, Mar. 25, 2004, 1 pg.

(List continued on next page.)

Primary Examiner—Yvonne R. Abbott
(74) Attorney, Agent, or Firm—Foley & Lardner, LLP

(57) ABSTRACT

A method and system for creating a customized animal feed is disclosed. The method and system include having ingredient data from more than one location, animal data, and representative of the mix of ingredients available at one or more locations. A customized feed is generated which is designed to fulfill the nutritional requirements for the animal's diet. The nutritional requirements are derived from the animal data. Furthermore, the feed is optimized to fulfill the requirements of the evaluation criteria. Evaluation criteria such as (i) animal production rate, (ii) the cost of feed per unit animal weight gain, and (iii) the feed weight per unit animal weight gain, are then utilized together with the feed data and animal data to provide a customized feed which has been generated based upon evaluation data which is representative of one or more of the evaluation criteria.

45 Claims, 3 Drawing Sheets

OTHER PUBLICATIONS

Black et al., "Simulation of Energy and Amino Acid Utilisation in the Pig", Research and Development in Agriculture, 3, 3, (1986), pp. 121–145, Longman Group, UK Ltd.

J.P Cant, "Modeling Milk Composition," Department of Animal and Poultry Science, University of Guelph, Canada.

Chavas et al., "Modeling Dynamic Agricultural Production Response: The Case of Swine Production", American Journal of Agricultural Economics, vol. 67, No. 3, Aug. 1985, pp. 636–646, American Agricultural Economics Association.

Derwent Abstract of SU 843 889; Accension No. 1982—E59773.

Derwent Abstract of EP 0715 806 A1; Accension No. 1996—260514.

G.C. Emmans, "The Growth of Turkeys", pp. 135–166.

Fisher et al., "A Model For The Description And Prediction Of The Response Of Laying Hens To Amino Acid Intake", BR. Poult. Sci., 14: pp. 469–484, 1972, Longman: printed in Great Britain.

Kilpatrick et al., "A Predictive Model For Beef Cattle Growth And Carcass Composition", Agricultural Systems 61, (1999) pp. 95–107.

Schematic representation of computer system commercially used by Cargill, Inc. prior to Dec. 1999, 1 page.

Talpaz et al., "Dynamic Optimization Model For Feeding Of Broilers", Agricultural Systems 20 (1986) pp. 121–132, Elsevier Applied Science Publishers Ltd. England, 1986. Printed in Great Britain.

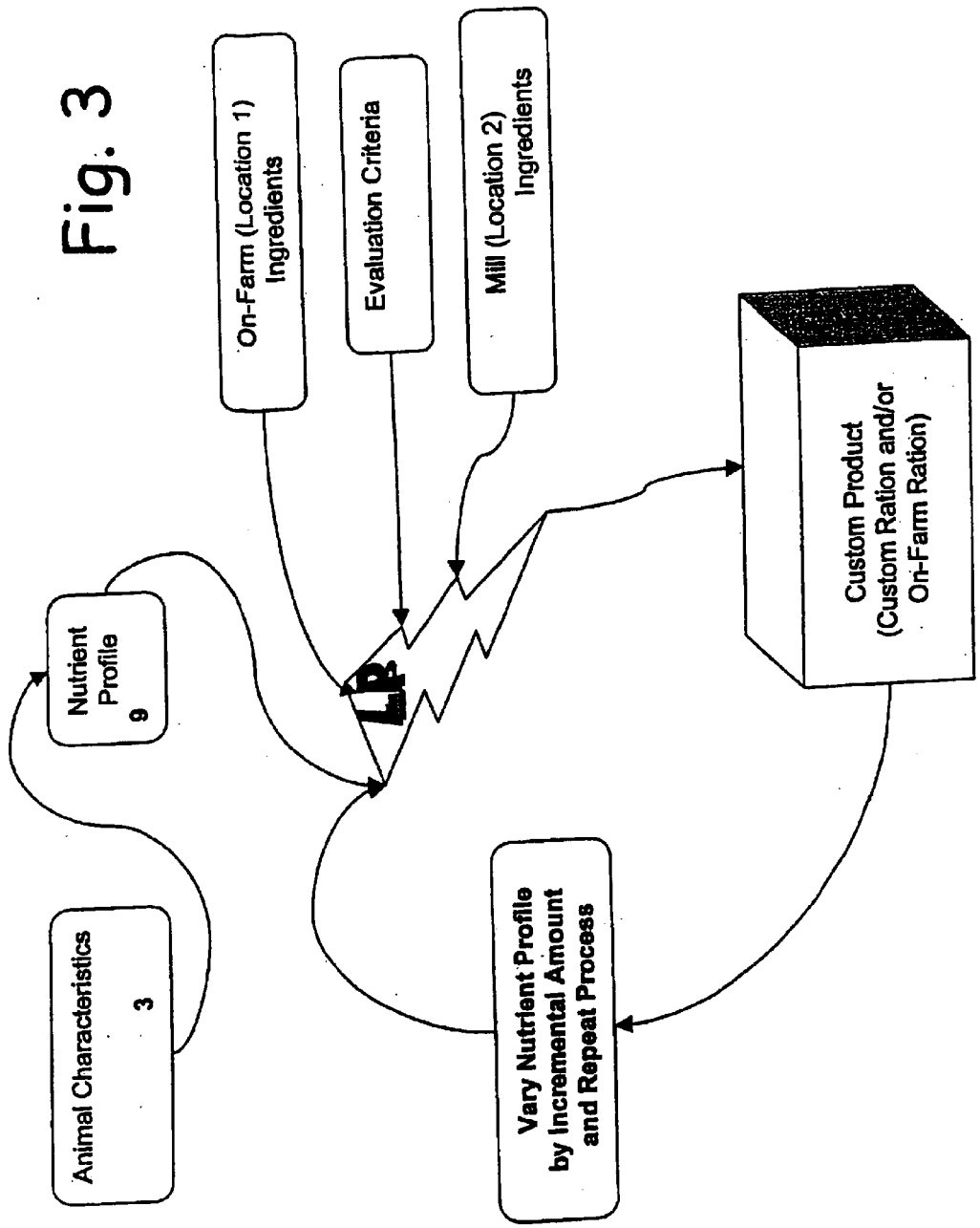

COMPUTER SYSTEM FOR DETERMINING A CUSTOMIZED ANIMAL FEED

CROSS REFERENCE TO RELATED PATENT APPLICATIONS

This application is a continuation of application Ser. No. 09/739,550 filed Dec. 15, 2000, now U.S. Pat. No. 6,681,717.

FIELD OF THE INVENTION

The present invention relates to a computerized system for determining a customized feed for animals, such as cattle, swine, poultry, fish, crustaceans and the like. In particular, the system determines a feed mix based upon data relating to information such as animal characteristics, available ingredients, speed of product production, and cost of production.

BACKGROUND

In food production, and specifically producing animal products such as milk, beef, pork, eggs, chicken, fish etc., there is need to improve production efficiency. Production efficiency, i.e. producing the maximum quantity of animal products while minimizing the time and cost of production for those products, is important in maintaining a competitive advantage.

A producer (i.e. a farmer, rancher, pork producer, and the like) generally wants to maximize the amount of animal product produced (e.g. gallons of milk, pounds of beef or pork produced) while keeping the costs associated with feed at a low level in order to achieve maximum animal productivity. The maximized amount of animal product should be produced at a minimized cost to the producer. Costs to the producer include the cost of feed needed to produce the animal products, as well as the costs of related equipment and facilities needed in the production of animal products. In order to minimize the effect of fixed costs associated with equipment and facilities, the maximum amount of animal product should preferably be produced in a minimum time period.

Producers are constantly trying to increase these production efficiencies. One way of increasing production efficiencies is by altering the feed which animals are fed. For example, a feed with certain amounts of nutrients can cause an animal to grow or produce animal products quickly and/or perform better, whereas a different feed with different amounts of nutrients may cause an animal to grow or produce animal products on a more cost effective basis.

Current systems for creating animal feed are not fully capable of helping producers evaluate and improve production efficiencies. Current systems commonly generate an overall nutrient profile which is related to a set of animal characteristics. Such systems then look at the overall nutrient profile and compare what nutrients may be had from the on-farm ingredients. From this comparison, a "nutritional gap" can be calculated, i.e., the nutritional requirements that the producer needs to fulfill his production goals after accounting for the use of his on-site feed. This nutritional gap is then compared to the nutritional components which may be available from ingredients located at a supplier's mill. Through a comparison of the nutritional gap and the nutritional components available from the mill, current systems allow a supplier to provide a cost effective custom feed which is optimized to permit an animal to produce desired animal products on a cost minimized basis.

currently systems exist that are capable of taking the amounts of on-farm ingredients to be used in the overall diet of the animal into account. This is typically done by accounting for the on-farm component of the animal's diet as a fixed input parameter in the determination. It would be advantageous to be able to modify the amounts of on-farm ingredients to be used in forming the custom feed as part of the optimization process. Moreover, current systems are generally limited to generating the custom feed based on a single evaluation criteria, typically based on the cost of the feed (e.g., on a cost of feed per unit of animal weight gain basis). It would be advantageous to have a system which is capable of utilizing more than one evaluation criteria in generating the custom feed.

SUMMARY

One embodiment of the present invention provides a system for determining customized feed for animals, such as farm livestock, poultry, fish and crustaceans. The system stores animal data representative of the characteristics of the animal, feed data representative of the feed ingredients located at one or more locations, and evaluation data representative of at least one evaluation criteria. The evaluation criteria are generally related to factors representative of animal productivity. Examples of evaluation criteria include (i) animal production rate (e.g., the rate of animal weight gain or the rate of production of a food product such as milk or eggs); (ii) cost of feed per unit animal weight gain; and (iii) feed weight per unit animal weight gain. The system includes a data processing circuit, which may devices which store the data. The data processing circuit is configured to generate profile data representative of a nutrient profile for the animals based upon the animal data. In effect, the nutrient profile is a description of the overall diet to be fed to the animals defined in terms of a set of nutritional parameters ("nutrients"). Using the profile data, the data processing circuit generates ration data representative of a combination of ingredients from one or more locations. The ration data is generated by the data processing circuit based upon the profile data, the feed data and the evaluation data.

Another embodiment of the system includes processing means for generating the profile data representative of a nutrient profile for the animals based upon the animal data. Using the profile data the data processing means generates ration data representative of a combination of ingredients from one or more locations. The ration data is generated by the data processing means based upon the profile data, the feed data and the evaluation data.

Another embodiment of the present invention provides a method for determining customized feed for one or more animals. The method includes storing animal data representative of the characteristics of the animal, storing feed data representative of the feed ingredients located a first location (e.g., on farm), storing second feed data representative of the feed ingredients located at a second location (e.g., at a supplier's mill), and storing evaluation data representative of one or more evaluation criteria. Profile data representative of a nutrient profile for the animal is generated based upon the animal data. Using the profile data, ration data representative of a combination of ingredients from one or more locations is generated based upon the profile data, feed data and evaluation data.

Another embodiment of the present invention provides customized feed produced by a process. The process includes storing animal data representative of the characteristics of the animal, feed data representative of the feed ingredients located a location, storing second feed data representative of the feed ingredients located at a second location, and storing evaluation data representative of at least one evaluation criteria. Profile data representative of a nutrient profile for the animal is generated based upon the animal data. Using the profile data, ration data representative of a combination of ingredients from the location is generated based further upon feed data and the evaluation data.

A further embodiment of the present invention provides a food product produced from an animal fed a customized feed. The food product is produced by a method which includes storing animal data representative of the characteristics of the animal, feed data representative of the feed ingredients located at a location, storing second feed data representative of the feed ingredients located at one or more additional locations, and storing evaluation data representative of at least one evaluation criteria. Profile data representative of a nutrient profile for the animal can be generated based upon the animal data. Using the profile data, ration data representative of a combination of ingredients from one or more of the locations is generated based further upon the feed data and evaluation data. The combination of ingredients is fed to the animal and the animal is appropriately processed to produce the desired food (e.g., a food product such as milk or eggs may be recovered from the animal or the animal may be slaughtered to provide meat for consumption by humans and/or other animals).

As modifications to the embodiments described herein, systems and/or methods may rely on more than one optimizing criteria and/or feed data representative of ingredients located at more than one location. For example, ingredients which could be used to create the ration may be located at the farm associated with the animals as well as at the mill of an ingredient supplier. Depending upon the requirements of the system, processing can be consolidated in one processor or divided between processors in communication via a network such as a LAN or the Internet. Furthermore, the processors may be located in devices such as workstations, portable PC's and/or hand held computers.

In other variations of the embodiments described herein, the systems and/or methods may further include a memory portion in communication with the digital processor which stores variation data representative of a range for one or more nutrients of the nutrient profile. The digital processor is capable of generating a set of ration data based upon the variation data. A memory portion of the system may store variation data which corresponds to preselected incremental variations for the values assigned to one or more individual nutrients in the nutritional profile.

Throughout this application, the text refers to various embodiments of the system and/or method. The various embodiments described are meant to provide a variety of exemplary examples and should not be construed as descriptions of alternative species. Moreover, it should be noted that the descriptions of the various embodiments provided herein may be of overlapping scope. The embodiments discussed herein are merely illustrative and are not meant to limit the scope of the present invention.

BRIEF DESCRIPTION OF THE DRAWINGS

FIG. 3 is a general schematic representation of the data flow in a variation of the System shown in FIG. 1.

DETAILED DESCRIPTION

An exemplary system, and process which can be used in producing a customized feed for animals, such as livestock, poultry, fish or crustaceans is described herein. How the system and process can increase production efficiencies by customizing feed is also disclosed. It is particularly desirable if the system and methods are capable of determining an optimized feed using one or more evaluation criteria. Examples of suitable evaluation criteria include a feed cost per unit animal weight gain basis, an animal production rate basis (e.g., based upon a rate of animal weight gain or a rate of production of an animal product, such as milk or eggs), and a feed amount per unit of animal weight gain basis.

In one embodiment of the present system, a computer system may be used which has a processing unit that executes sequences of instructions contained in memory. More specifically, execution of the sequences of instructions causes the processing unit to perform various operations, which are described herein. The instructions may be loaded into a random access memory (RAM) for execution by the processing unit from a read-only memory (ROM), a mass storage device, or some other persistent storage. In other embodiments, hardwired circuitry may be used in place of, or in combination with, software instructions to implement the present method. Thus, the embodiments described herein are not limited to any specific combination of hardware circuitry and/or software, nor to any particular source for the instructions executed by the computer system.

Figure 1:
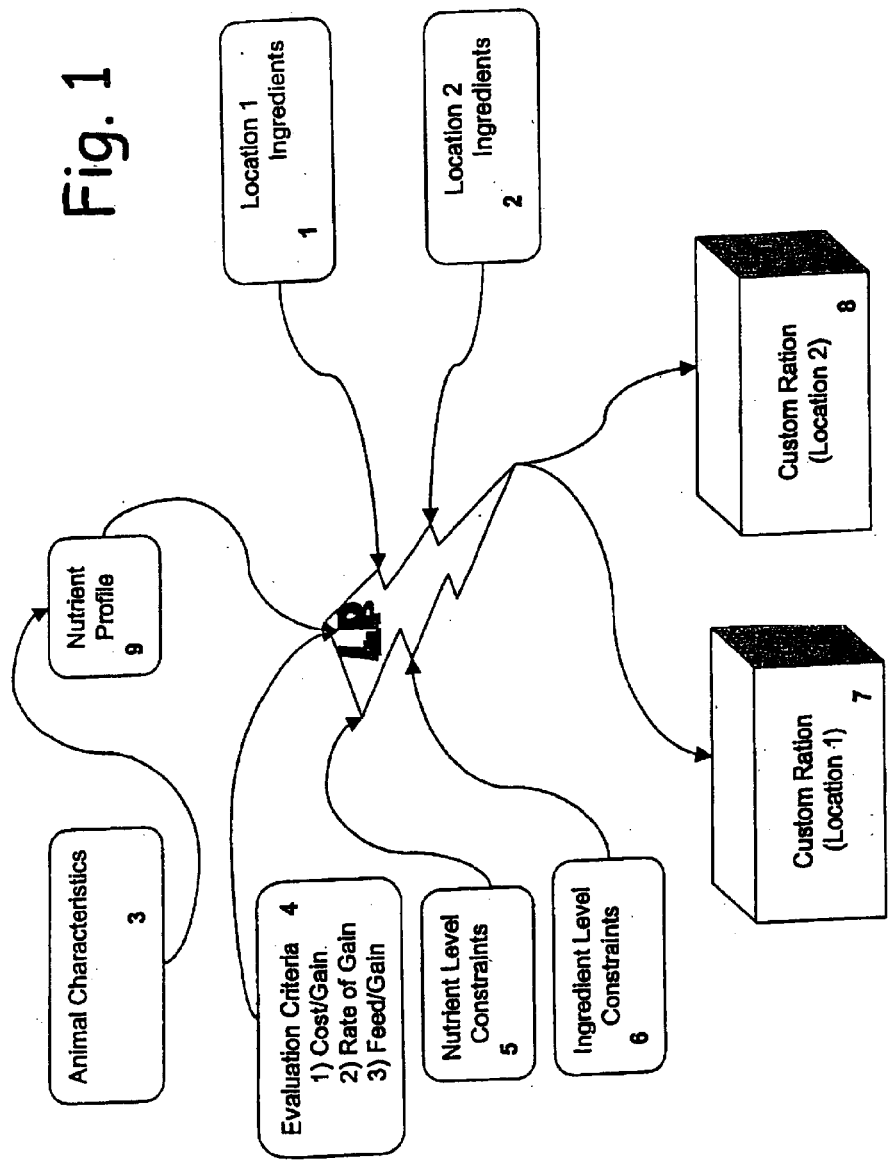
FIG. 1 is a general schematic representation of the data flow in one embodiment of the present System.

Creating a customized feed typically involves processing and manipulating at least four basic data sets (see, e.g., FIG. 1): first feed data representative of the collection of ingredients located at a first location 1, second feed data representative of the collection ingredients located at a second location 2, animal data representative of characteristics of the animal 3 (e.g., parameters related to its genotype, production level, environment and/or feeding regime), and evaluation criteria 4. As will be explained below, very often first and second feed data representative of sets of ingredients located at an on-farm site (first ingredients 1 located at a first location) and ingredients located at a supplier's mill site (second ingredients 2 located at a second location) are used to generate the recommended mix of ingredients to be fed to the animal. In many instances, the ration data define an overall diet for the animal which includes custom rations from more than one location (e.g., a custom ration from a first location 7 and a custom ration from a second location 8 as depicted in FIG. 1). These can be combined to create a customized feed ("ration") which fulfills the animal data requirements while meeting the evaluation criteria 4.

The evaluation criteria may be chosen from such suitable criteria related to animal productivity as (i) animal production rate, (ii) cost of feed per unit animal weight gain, and (iii) feed weight per unit animal weight gain.

In some modified embodiments, the present system may include additional memory portions for storing nutrient level constraints 5 and/or ingredient level constraints 6. This may be useful where, for example, it has been established that higher levels of certain nutritional components could pose a risk to the health of an animal being fed the custom feed. For example, if the custom feed includes some trace minerals, such as selenium, present in too great an amount, the custom feed may have adverse health consequences to the animal. Various embodiments of the present invention allow constraints to be placed on the maximum and/or minimum amounts of one or more nutrients in the profile data generated. In some embodiments, this may be used together with the animal data as a basis to calculate the profile data. These constraints may be stored in a memory location as part of the system or the system may permit an individual operator to input one or more constraints on the amount of particular nutrient(s) in the profile data generated by the system. Similarly, it may be desirable to limit the amounts of one or more ingredients in either a custom product mix or in the overall diet to be fed to the animal. For example, for ease of formulation of a custom feed in pellet form it may be desirable to limit the amount of certain ingredients and/or require the inclusion of minimum amounts of specified ingredients.

The first data set that is generally input into the system and subsequently stored in a memory portion includes data representative of characteristics of the animal. Examples of types of data representative of animal characteristics ("animal data") include beginning weight of the animal; a desired weight of the animal; an environment of the animal; a feed form; an actual or desired production level of the animal; and a relationship of animal muscle to fat of the animal. For example, the nutrient profile generated for a particular animal can vary based upon a number of different characteristics of the animal relating to one or more of its genotype, environment, current condition (e.g., defined in terms of health and/or weight), desired production level, feed form (e.g., meal or pellet), current production level, desired final condition (e.g., defined in terms of final weight and/or relationship of animal muscle to fat of the animal) and the like. Tables 1 and 2 below list illustrative sets of animal characteristics which can be used as a basis to generate nutritional profiles to be used in designing custom rations ("custom feeds") for swine and dairy cattle, respectively.

TABLE 1

Animal Characteristics Suitable for Generating
a Nutritional Profile for a Feed for Swine

| Animal Category | Genotype (lean gain) |
|---|---|
| Finisher | Effective Ambient Temperature |
| Gilt Replacement | Temperature |
| Grow | Draft |
| Prebred | Bedding |
| Sow | % of pigs that are wet) |
| Gestation | Pigs per pen |
| Lactation | Pig density (square feet per pig) |
| Artificial Insemination Boar | Health |
| Begin Weight | Flooring Type |
| End Weight | Total pigs born/litter |
| Feed Disappearance (Intake) | Litter weight gain |
| Feed Wastage | Total pigs born/litter |
| Feed Form | |

TABLE 2

Animal Characteristics Suitable for Generating
a Nutritional Profile for Dairy Cattle

| Target Milk Weight (volume) | Body Weight |
|---|---|
| Target Milk Butterfat % | Body Weight Change |
| Target Milk Protein % | Body Condition Score (current) |
| Current Milk Weight (volume) | Body Condition Score (desired) |
| Current Milk Butterfat % | Actual Dry Matter Intake |
| Current Milk Protein % | Environmental Temperature |
| Percent of group in first lactation | Environmental Humidity |
| Percent of group in second lactation | Genotype |

The animal data representative of the characteristics of the animal may be inputted into a computer system with a memory portion available and configured to store the data. The animal data representative of the characteristics of the animal may be inputted into the system by a variety of methods known to those skilled in the art including a keyboard, mouse, touchpad, computer, internet or other related device.

The system includes a data processing circuit which is configured to generate profile data representative of a nutrient profile for the animals based upon the animal data. In effect, the nutrient profile is a description of the overall diet to be fed to the animals defined in terms of a set of nutritional parameters ("nutrients"). Depending on the desired degree of sophistication of the system, the profile data may include a relatively small set of amounts of nutrients or large number of amounts of nutrients. Table 3 includes an illustrative list of nutrients that may be used delineating profile data for animals such as pigs and dairy cattle. Of course, the list of nutrients used in generating profile data may differ for different types of livestock or other animals. Tables 4 and 5 respectively contain lists of nutrients suitable for use in generating nutritional profiles for swine and dairy cattle, respectively.

The data processing circuit in the present system is also configured to generate ration data representative of a combination of ingredients from one or more locations. The ration data is generated by the data processing circuit based upon the profile data, feed data representative of the feed ingredients available at the location(s) and evaluation data representative of one or more evaluation criteria.

TABLE 3

Nutrients Suitable for Generating
a Nutritional Profile

| Animal Fat | Rumres Nfc |
|---|---|
| Ascorbic Acid | Salt |
| Biotin | Selenium |
| Cal/Phos | Simple Sugar |
| Chloride | Sodium |
| Choline | Sol Rdp |
| Chromium | Sulfur |
| Cobalt | Sw Obs Me |
| Copper | Thiamine |
| Arginine (Total and/or Digestible) | Total Rdp |
| Cystine (Total and/or Digestible) | Verified Adf |
| Isoleucine (Total and/or Digestible) | Verified Ash |
| Leucine (Total and/or Digestible) | Verified Calcium |
| Lysine (Total and/or Digestible) | Verified Dry Matt |
| Methionine (Total and/or Digestible) | Verified Fat |
| Phenylalanine (Total and/or Digestible) | Verified Fiber |
| Threonine (Total and/or Digestible) | Verified Hemi |
| Tryptophan (Total and/or Digestible) | Verified Moisture |
| Valine (Total and/or Digestible) | Verified Ndf |
| Folic Acid | Verified Neg |
| Phosphate | Verified Nel |
| Iodine | Verified Nem |
| Iron | Verified Nfc |
| Lactose | Verified Phos |
| Lasalocid | Verified Protein |
| Magnesium | Verified Rup |
| Manganese | Vitamin A |
| Monensin | Vitamin B12 |
| Niacin | Vitamin B6 |
| Potassium | Vitamin D |
| Protein | Vitamin E |
| Pyridoxine | Vitamin K |
| Rh Index | Zinc |
| Riboflavin | |
| Rough Ndf | |
| Rum Solsug | |

TABLE 4

Nutrients Suitable for Generating
a Nutritional Profile for Swine

| | |
|---|---|
| Biotin | True Swine Digestible isoleucine |
| Cal/Phos | True Swine Digestible lysine |
| Choline | True Swine Digestible methionine |
| Coppr Add | True Swine Digestible threonine |
| Folic Acid | True Swine Digestible tryptophan |
| Iodine Add | True Swine Digestible valine |
| Iron Add | V Calcium |
| Mang Add | V Phos |
| Niacin | V Protein |
| Pantotnc | Vit A |
| Pyridoxine | Vit D |
| Riboflavin | Vit E |
| Salt | Vit K |
| Selenium Add | Vitamin B12 |
| Sodium | Zinc |
| Sw Digphos | |
| Thiamine | |

TABLE 5

Nutrients Suitable for Generating
a Nutritional Profile for Dairy Cattle

| | |
|---|---|
| Acid Detergent Fiber | Non-Protein Nitrogen |
| Biotin | Phosphorus |
| Calcium | Potassium |
| Chloride | Protein |
| Cobalt | Rumen Degradable Protein |
| Copper | Rumen Undegraded Alanine |
| Dietary Cation Anion Difference | Rumen Undegraded Histidine |
| Digestible Neutral Detergent Fiber | Rumen Undegraded Isoleucine |
| Dry Matter | Rumen Undegraded Leucine |
| Fat | Rumen Undegraded Lysine |
| Intestinally Digestible Arginine | Rumen Undegraded Methionine |
| Intestinally Digestible Histidine | Rumen Undegraded Phenylalanine |
| Intestinally Digestible Isoleucine | Rumen Undegraded Protein |
| Intestinally Digestible Leucine | Rumen Undegraded Tryptophan |
| Intestinally Digestible Lysine | Rumen Undegraded Valine |
| Intestinally Digestible Methionine | Salt |
| Intestinally Digestible Phenylalanine | Selenium |
| Intestinally Digestible Threonine | Sodium |
| Intestinally Digestible Tryptophan | Soluble Protein |
| Intestinally Digestible Valine | Soluble Sugar |
| Iodine | Starch |
| Iron | Sulfur |
| Magnesium | Verified Net Energy for Lactation |
| Manganese | Vitamin A |
| Neutral Detergent Fiber | Vitamin D |
| Neutral Detergent Fiber from Roughage | Vitamin E |
| Niacin | Zinc |
| Non Fiber Carbohydrates | |

Evaluation criteria are typically related to factors representative of animal productivity and reflect an aspect of production a producer would like to optimize. The present system allows a producer to select evaluation criteria (e.g. cost/gain, cost/output, animal production rate, and/or feed/gain) which fits the producer's production goals. For example, a dairy producer may focus on the cost of feed required to produce a unit of output (cost/output), whereas a pork producer may focus on cost/gain or rate of gain.

Examples of suitable animal production criteria which may be used as evaluation criteria in the generation of ration data include (i) animal production rate, (ii) the cost of feed per unit animal weight gain, and (iii) the feed weight per unit animal weight gain. The animal production rate may simply be a measure representative of the rate of weight gain of the animal in question (rate of gain). For example, a pork producer may wish to optimize rate of gain by selecting a feed which maximizes the rate at which a pig gains weight. This could be selected if a pig farmer was interested in turning over production as quickly as possible in a fixed asset which has limited space. The evaluation data may include data representative of the cost of feed required to produce a unit of weight gain of the animal ("cost/gain" basis). For example, a pork producer may wish to optimize cost/gain by selecting a feed which minimizes the feed cost required to make a pig gain a unit of weight. The evaluation data can include data representative of the amount of feed required to produce a unit of gain (feed/gain). For example, a producer may wish to optimize the feed/gain by selecting a feed which minimizes the amount of feed required to produce a unit of gain. A producer might select this criterion if they were faced with feed storage space constraints.

Examples of other suitable animal production rates which may be used as an evaluation criteria include rates of production of food products, such as milk or eggs, from the animal. Other suitable evaluation criteria include the cost of feed required to produce a unit of output of a particular animal product ("cost/output"). For example, a milk producer may wish to optimize the cost/output by selecting a feed which minimizes the cost of feed required to produce a unit of milk. In addition to utilizing evaluation data representative of only a single evaluation criteria, the present system may be capable of using evaluation data representative of a combination of two or more evaluation criteria in generating the ration data. For example, when considering an appropriate feed, a producer may wish to generate a custom feed based on the rate of production as well as cost of the feed (typically on a cost/gain basis).

Furthermore, the producer may choose to weight the relative contributions of two or more evaluation criteria. The system may include a data processing circuit which generates ration data based in part upon a weighted average of more than one evaluation criteria. In one specific embodiment, the system generates ration data based in part upon a 70:30 weighted average of two evaluation criteria (primary and secondary), such as a combination of cost of feed per unit animal weight gain and animal production rate. The system may also allow a user to alter the relative weighting accorded to the various evaluation criteria selected.

For instance, in the example referred to above, the producer may want to generate ration data using a combination of evaluation criteria that is weighted 70% on a cost/gain basis and 30% on a rate of animal weight gain basis. One method for providing such a weighted optimization analysis is to generate one solution for ration data using cost/gain as the sole evaluation criteria and generating a second for ration data using rate of animal weight gain as the sole evaluation criteria. Ration data which is representative of the weighted combined solution can be achieved by summing 70% of the amounts of ingredients from the cost/gain ration data set and 30% of the amounts of ingredients from the rate of gain ration data set. For example, in the instance where cost/gain ration data (generated solely on a cost/gain basis) includes 10% dehulled corn meal, and rate of gain ration data (generated solely on a rate of gain basis) includes 15% dehulled corn meal, if a producer chose cost/gain as the primary evaluation criteria the ingredient mix in the diet will include roughly 70% of the 10% dehulled corn meal requirement, and 30% of the 15% dehulled corn meal requirement summed to produce the amount of dehulled corn meal in the overall diet (i.e., circa 11.5% dehulled corn meal). This weighted summation is then repeated for all the amounts of ingredients present in the two custom diets generated by the two approaches. As one skilled in the art will recognize, there are other methods of generating ration data based on a weighted combination of evaluation criteria. The present system can also be configured to generate ration data based on other weightings of combinations of two or more evaluation criteria (e.g., two evaluation criteria weighted on either a 60:40 or 80:20 basis). In some embodiments of the present system, the weighting factors assigned to various evaluation criteria can themselves be input parameter(s) chosen by a producer to reflect the needs of his/her particular situation.

Figure 2:
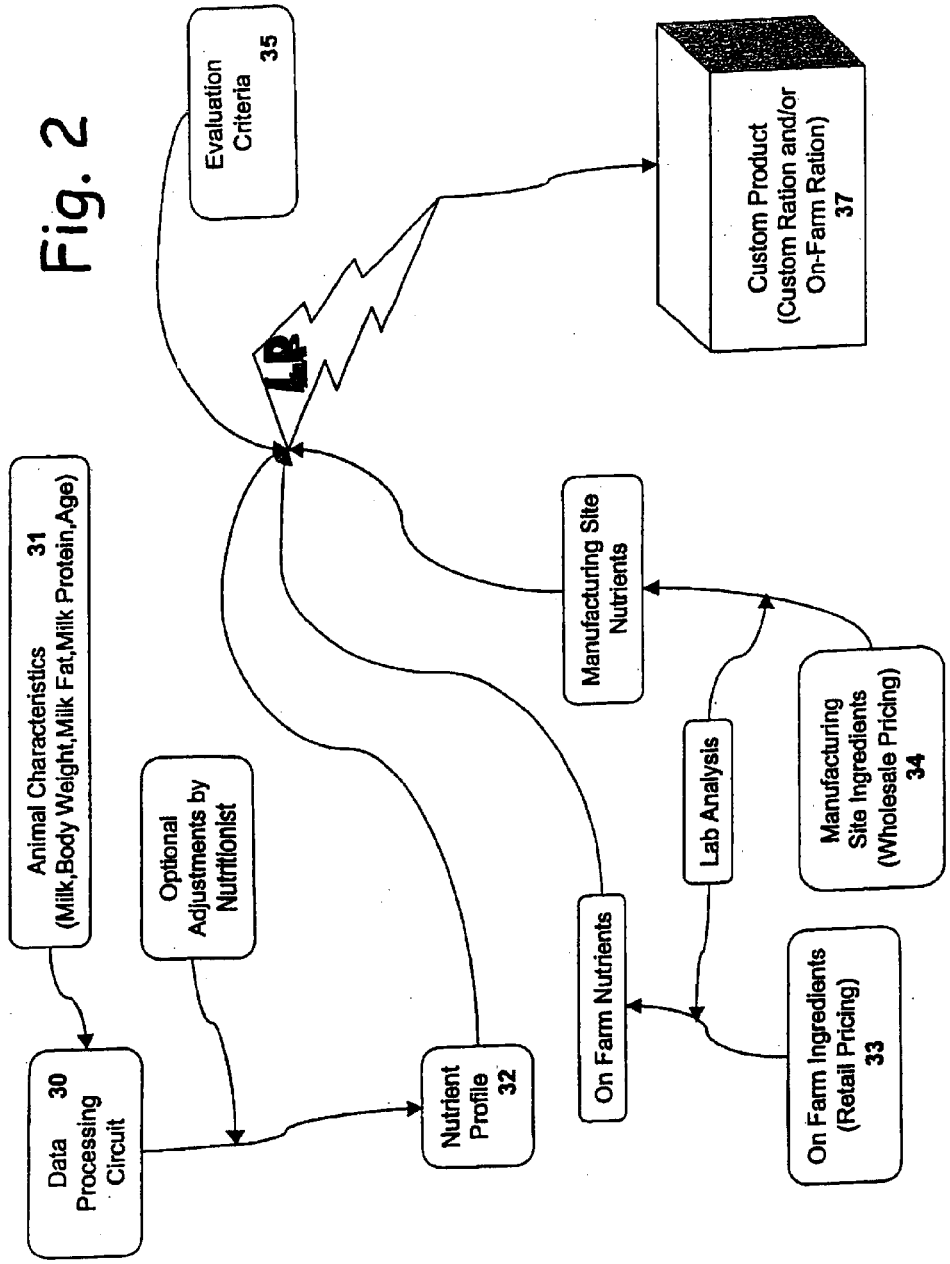
FIG. 2 is a general schematic representation of the data flow in another embodiment of the System which is designed to be used to generate a custom product ("Custom Ration") and/or feed mix from on-site ingredients ("On-Farm Ration") optimized for milk production and/or quality.

FIG. 2 depicts the general flow of data in one embodiment of the present system. The system shown in FIG. 2 includes a data processing circuit 30 configured to generate a nutrient profile 32 based on the animal data 31 and optional adjustments which may be provided by a nutritionist. Other data processing circuits generate lists of nutrient amounts associated with individual ingredients available at an on-farm site 33 and manufacturing site 34. A data processing circuit 36, which includes a linear program generates a custom product based on evaluation criteria 35. The linear program typically also generates the custom product solution based on pricing data associated with both the on-farm and manufacturing site ingredients. In one embodiment, retail and wholesale pricing information may be normalized to allow the linear program to facilitate consideration of potential ingredients with different types of associated prices as the basis for a solution to a single multivariable problem. The linear program is a mathematical model capable of solving problems involving a large number of variables limited by constraints using linear math functions. A variety of different linear programs capable of solving problems of this type are known to those of skill in the art. One example of a program of this type is commercially available from Format International as part of computer software system for solving complicated multivariable problems.

Memory portions of the systems which store animal data, evaluation data, and feed data representative of on-hand ingredients and/or mill ingredients are in communication with a data processing unit capable of generating ration data. The data processing unit can include a data processing circuit or a digital processing circuit. The memory portions which store the animal data, feed data for on-hand and mill ingredients, and evaluation data may be in communication with the data processing unit by inputted keyboard commands, mouse commands, a network connection with another computer, personal data assistants, via a modem connection, via an internet, or via an intranet.

Data processing circuit(s) which include the linear program can take input data (e.g., profile data, feed data, evaluation data and ingredient constraint data) as a basis to compute ration data. Ration data includes data specifying a combination of ingredients solution which is solved to fulfill a desired nutrient profile based on one or more evaluation criteria. Ration data generated by the present system generally includes data representative of the types and amounts of ingredients to be used to provide an overall custom diet for an animal. The ration data provided by the system generally also specifies a solution that is described in terms of a combination of types and amounts of ingredients from a first location (e.g., an on-farm location) and types and amounts of ingredients from at least one additional site (e.g., one or more supplier locations). Where the overall set of potential ingredients includes ingredients located at more than one location, the custom feed specified by the ration data may be made of ingredients located at either a single location or from more than one location. For example, the ration data may define a custom feed made up from ingredients located solely at supplier location or made up from ingredients located at both an on-farm location and a supplier location.

The ration data generally include custom feed data representative of a combination of amounts of the feed ingredients. The custom feed data may specify the type and corresponding amounts of the ingredients to be used in formulating the overall diet of an animal. This may be made up from a set of ingredients available at more than one location, e.g., from ingredients available at a producer's site and as well as ingredients available at a supplier location. The present system may also provide custom feed data which specifies the types and amounts of ingredients to be used from individual locations. For example, the custom feed data may include a listing of the types and amounts of ingredients available at a first location (e.g., on-farm ingredients) to be used to form a first feed mix and a listing of the types and amounts of ingredients available at a second location (e.g., ingredients available at a supplier location) to be used to form a second feed mix. In such instances, the custom feed data will typically also specify the amounts of the first and second feed mixes that are to be used to make up the overall custom diet for an animal.

The ration data typically includes amounts of a variety of types of ingredients. The actual ingredients available at any particular location can vary over time and will generally vary on a regional basis as well as reflect the type of animal feed that is typically produced and/or stored at the particular site. Commonly, the ration data include feed data representative of amounts of ingredients from a number of different ingredient categories, such as a grain source, a protein source, a vitamin source, a mineral source (e.g., a macro-mineral source and/or a trace mineral source) and/or a fat source. Table 6 includes a list of exemplary ingredients suitable for use in formulating custom feed mixes for a variety of animals. Tables 7, 8 and 9 include lists of ingredients which may be used in generating custom feed products for swine or dairy cattle.

TABLE 7

Ingredients Suitable for Use in Producing a Custom Feed for a Finishing Diet for Swine

| | |
|---|---|
| Alimet | Linseed Meal |
| Bakery Product | L-Lysine HCl |
| Beet Pulp | Lt. Barley |
| Brewers Rice | L-Threonine |
| Brown Sugar | Malt Sprouts |
| Calcium Carb | Meat And Bone Meal |
| Cane Sugar | Menhaden Fish |
| Canola Meal | Molasses |
| Cereal Fines | Mono-Dical Phos |
| Cg Feed | Monosod Phos |
| Choline | Oat Mill Byproducts |
| Copper Sulfate | Oat Mill Byproducts |
| Corn - Ground Fine | Oats - Ground |
| Corn Gluten Meal | Oats - Rolled |
| Corn Oil | Pork Bloodmeal |
| Corn Starch | Safflower Meal |
| Dehydrated Alfalfa | Salt |
| Distillers Grains With Soil | Selenium |
| Dried Potato Waste | Soybean Hulls |
| Dynasol | Soybean Meal |
| Fat | Soybean Oil |
| Fat Sprayed | Sunflower |
| Feather Meal | Tryptosin |
| Feeding Rate | Wheat Midds |
| Fish Meal | |

TABLE 8

Ingredients Suitable for Use in Producing a Custom Feed for Breeding Swine

| | |
|---|---|
| Alimet | Methionine |
| Animal Fat | Mineral Oil |
| Ascorb Acid | Molasses-Cane |
| Bakery Product | Mono-Dicalcium Phosphate |
| Bentonite | Oat Hulls |
| Blood Meal - Beef/Pork | Red Flavor |
| Calcium Carbonate | Rice Bran |
| Cereal Fines | Salt |
| Choline Chloride | Selenium |
| Copper Sulfate | Soybean Hulls |
| Corn Germ Meal | Threonine |
| Corn Gluten Feed | Tryptophan |
| Distillers Grains With Solubles | Vitamin E |
| Dry Methionine Hydroxy Analog | Wheat Midds |
| Fish Meal | Wheat Starch |
| Malt Sprouts | Zinc Oxide |
| Meat And Bone Meal; Pork Carcass | Zinc Sulfate |

TABLE 9

Ingredients Suitable for Producing a Custom Feed for Dairy Cattle

| | |
|---|---|
| Calcium Carbonate | Salt |
| Copper Sulfate | Selenium |
| Corn Gluten Meal | Sodium Sesquicarbonate |
| Fat | Soybean Hulls |
| Magnesium Oxide | Soybean Meal |
| Meat And Bone Meal, Pork | Trace Minerals |
| Mono-Dical Phos | Urea |
| Niacin | Vitamin-E |
| Pork Blood Meal | Wheat Midds |
| K/Mg/Sulfate | Zin-Pro |
| Yeast | |

When feeding animals, producers may not be able to satisfy nutritional requirements of the animals solely using on-hand ingredients (e.g., on-farm ingredients). To satisfy the animal's nutritional requirements, producers may desire to use on-hand ingredients in conjunction with a custom feed product made up of feed ingredients available from an outside supplier, such as a mill, feed mixer, and the like. The outside supplier will commonly have a range of ingredients available or on hand in their inventory (e.g., corn in various forms, soybean meal, wheat mids, barley, oats, animal fat, various vitamin supplements).

In addition to data specifying the types and amounts of ingredients to be used to provide the overall custom diet for an animal, the ration data generated by the present system can also include other data associated with the overall custom diet. Examples of such other data include cost data representative of a cost associated with the custom feed data, feed weight data representative of a feed weight associated with the custom feed data, and performance data representative of projected animal performance associated with the custom feed data. For example, Table 10 below lists a number of categories of ration data that may be useful in assisting a producer and/or supplier in evaluating a custom feed with respect to productivity, animal performance and cost effectiveness. The availability of these types of information can provide a producer and/or supplier with additional information concerning the effects of variations in dietary composition on factors such as cost, volume of feed, wastage and animal performance. As with the listing(s) of the types and amounts of ingredients, the cost data and feed weight data can be representative of costs and feed weights associated with the overall custom diet and/or with feed mix(es) to be provided from individual locations.

TABLE 10

Illustrative Categories of Ration Data Associated with a Custom Feed for Swine

| | |
|---|---|
| End Weight | Lean Gain |
| Days in Phase | Lean % |
| Avg Daily Gain | Effective Ambient Temp |
| Avg Daily Feed Intake | Cost of Gain |
| Total Feed Consumed | Total Cost per phase |
| Feed/Gain | |

In other variations of the embodiments described herein, the systems and/or methods may also include a memory portion in communication with the digital processor which stores variation data representative of a range for one or more nutrient components of the nutrient profile. The digital processor is capable of generating a set of ration data based upon the variation data. The memory portion may store variation data which correspond to preselected incremental variations for the values assigned to one or more individual nutrients in the nutritional profile. For example, memory portion may store variation data which correspond to preselected incremental positive and negative variations of the values assigned to two individual nutrients, such as true digestible lysine and net energy. The digital processor would generate ration data corresponding to each of the eight possible additional combinations of values for the two specified nutrients. Together with the ration data associated with the original nutritional profile, the resulting set of nine ration data corresponding to the various combinations of values for each specified nutrient (original value, original value plus an increment; original value minus an increment) would make up a three by three matrix of ration data. One example of this approach is illustrated in Table 11 below. A general approach to generating a set of ration data based upon variation data is depicted schematically in FIG. 3. The determination of ration data for the center point in the matrix ("Ration Data 5") corresponds to the solution generated by the data processing circuit based on the nutrient profile. In the example shown in Table 11, the nutrient profile has values of 0.90% for true digestible lysine and 2150 kcal/kg for net energy. Each of the eight other ration data in the set depicted in Table 11 corresponds to a ration data generated for a modified nutrient profile in which the value for at least one nutrient has been varied by a specified increment. For example, Ration Data 1 represents ration data associated with a modified nutrient profile has values of 0.95% for true digestible lysine and 2100 kcal/kg for net energy. Ration Data 6 represents ration data associated with a modified nutrient profile in which only the value for true digestible lysine (0.85%) has been varied from the values in the nutrient profile. The generation of such a matrix can facilitate an evaluation of the effect of incremental variations in amounts of specified nutrient(s) on the assessment of optimum ration data for a given evaluation criteria.

TABLE 11

True Digestible Lysine

| Net Energy (kcal/kg) | 0.95% | 0.90% | 0.85% |
|---|---|---|---|
| 2100 | Ration Data 1 | Ration Data 2 | Ration Data 3 |
| 2150 | Ration Data 4 | Ration Data 5 | Ration Data 6 |
| 2200 | Ration Data 7 | Ration Data 8 | Ration Data 9 |

The invention has been described with reference to various specific and illustrative embodiments and techniques. However, it should be understood that many variations and modifications may be made while remaining within the spirit and scope of the invention.

TABLE 6

Exemplary Ingredients Suitable for Use in Formulating Custom Feed Mixes

| | | |
|---|---|---|
| Acidulated Soap Stocks | Beet | Cobalt |
| Active Dry Yeast | Beet Pulp | Cobalt Carbonate |
| Alfalfa Meal | Biotin | Cobalt Sulfate |
| Alfalfa-Dehydrated | Biscuit By Product | Cocoa Cake |
| Alimet | Black Beans | Cocoa Hulls |
| Alka Culture | Blood-Flash Dry | Copper Oxide |
| Alkaten | Blueprint Rx | Copper Sulfate |
| Almond Hulls | Bone Meal | Corn Chips |
| Ammonium Chloride | Brewers Rice | Corn Chops |
| Ammonium Lignin | Brix Cane | Corn Coarse Cracked |
| Ammonium Polyphosphate | Buckwheat | Corn-Coarse Ground |
| Ammonium Sulfate | Bugs | Corn Cob-Ground |
| Amprol | Cage Calcium | Corn Distillers |
| Amprol Ethopaba | Calcium Cake | Corn Flint |
| Anhydrous Ammonia | Calcium Chloride | Corn Flour |
| Appetein | Calcium Formate | Corn Germ Bran |
| Apramycin | Calcium Iodate | Corn Germ Meal |
| Arsanilic Acid | Calcium Sulfate | Corn Gluten |
| Ascorb Acid | Calciun Prop | Corn-High Oil |
| Aspen Bedding | Calf Manna | Corn Kiblets |
| Availa | Canadian Peas | Corn Meal Dehulled |
| Avizyme | Cane-Whey | Corn Oil |
| Bacitracin Zinc | Canola Cake | Corn Residue |
| Bakery Product | Canola Fines | Corn Starch |
| Barley | Canola Meal | Corn/Sugar Blend |
| Barley-Crimped | Canola Oil | Corn-Cracked |
| Barley-Ground | Canola Oil Blender | Corn-Crimped |
| Barley-Hulless | Canola Oil Mix | Corn-Ground Fine |
| Barley-Hulls | Canola Screenings | Corn-Ground Roasted |
| Barley-Midds | Canola-Whole | Corn-Steam Flaked |
| Barley-Needles | Carbadox | Corn-Steamed |
| Barley-Rolled | Carob Germ | Corn-Whole |
| Barley-St. Bon. | Carob Meal | Cottonseed Culled |
| Barley-Whole | Cashew Nut By Product | Cottonseed Hull |
| Barley-With Enzyme | Catfish Offal Meal | Cottonseed Meal |
| | Choline Chloride | Cottonseed Oil |
| Baymag | Chromium Tripicolinate | Cottonseed Whole |
| Beef Peanut Hulls | Citrus Pulp | Coumaphos |
| Beef Peanut Meal | Clopidol | Culled Beans |
| Danish Fishmeal | Hemicellulose Extract | Molasses |
| Decoquinate | Hemp | Molasses Blend |
| Dextrose | Herring Meal | Molasses Dried |
| Diamond V Yeast | Hominy | Molasses Standard Beet |
| Disodium Phosphate | Hygromycin | Molasses Standard Cane |
| Distillers Grains | Indian Soybean Meal | Molasses-Pellet |
| Dried Apple Pomace | Iron Oxide-Red | Mold |

TABLE 6-continued

Exemplary Ingredients Suitable for Use in Formulating Custom Feed Mixes

| | | |
|---|---|---|
| Dried Brewers Yeast | Iron-Oxide Yellow | Monensin |
| Dried Distillers Milo | Job's Tear Broken Seeds | Monoamonum Phos |
| Dried Porcine | Kapok Seed Meal | Monosodium Glutamate |
| Dried Whole Milk Powder | Kelp Meal | Monosodium Phosphate |
| | Kem Wet | Mung Bean Hulls |
| Duralass | Lactose | Mustard Meal High Fat |
| Enzyme Booster | Larvadex | Mustard Oil |
| Epsom Salts | Lasalocid | Mustard Shorts |
| Erythromycin | Levams Hcl | Narasin |
| Extruded Grain | Limestone | Natuphos |
| Extruded Soy Flour | Linco | Niacin |
| Fat | Lincomix | Nicarbazin |
| Feather Meal | Lincomycin | Nitarsone |
| Feeding Oatmeal | Linseed Meal | Oat Cullets |
| Fenbendazole | Liquid Fish Solubles | Oat Flour |
| Fermacto | Lupins | Oat Groats |
| Ferric Chloride | Lysine | Oat Hulls |
| Ferrou Cabonate | Magnesium | Oat Mill Byproducts |
| Ferrous Carbonate | Magnesium Sulfate | Oat Screenings |
| Ferrous Sulfate | Malt Plant By-Products | Oat Whole Cereal |
| Fine Job's Tear Bran | Manganous Ox | Oatmill Feed |
| Fish Meal | Maple Flavor | Oats Flaked |
| Fish Flavoring | Masonex | Oats-Ground |
| | Meat And Bone Meal | Oats-Hulless |
| Folic Acid | Meat And Bone Meal | Oats-Premium |
| French Fry Rejects | Meat Meal | Oats-Rolled |
| Fresh Arome | Mepron | Oats-Whole |
| Fried Wheat Noodles | Methionine | Oyster Shell |
| Gold Dye | Millet Screenings | Paddy Rice |
| Gold Flavor | Millet White | Palm Kernel |
| Grain Dust | Millet-Ground | Papain |
| Grain Screening | Milo Binder | Papain Enzyme |
| Granite Grit | Milo-Coarse Ground | Paprika Spent Meal |
| Grape Pomace | Milo-Cracked | Parboiled Broken Rice |
| Green Dye | Milo-Whole | Pea By-Product |
| Green Flavor | Mineral Flavor | Pea Flour |
| Guar Gum | Mineral Oil | Peanut Meal |
| Hard Shell | Mixed Blood Meal | Peanut Skins |
| Pelcote Dusting | Roxarsone | Steam Flaked Wheat |
| Phosphate | Rumen Paunch | Sugar (Cane) |
| Phosphoric Acid | Rumensin | Sulfamex-Ormeto |
| Phosphorus | Rye | Sulfur |
| Phosphorus Defluorinated | Rye Distillers | Sulfur |
| Pig Nectar | Rye With Enzymes | Sunflower Meal |
| Plant Waste | Safflower Meal | Sunflower Seed |
| Poloxalene | Safflower Oil | Tallow Fancy |
| Popcorn | Safflower Seed | Tallow-Die |
| Popcorn Screenings | Sago Meal | Tallow-Mixer |
| Porcine Plasma; Dried | Salinomycin | Tapioca Meal |
| Pork Bloodmeal | Salt | Tapioca Promeance |
| Porzyme | Scallop Meal | Taurine |
| Posistac | Seaweed Meal | Terramycin |
| Potassium Bicarbonate | Selenium | Thiabenzol |
| Potassium Carbonate | Shell Aid | Thiamine Mono |
| Potassium Magnesium Sulfate | Shrimp Byproduct | Threonine |
| | Silkworms | Tiamulin |
| Potassium Sulfate | Sipernate | Tilmicosin |
| Potato Chips | Sodium Acetate | Tomato Pomace |
| Poultry Blood/ Feather Meal | Sodium Benzoate | Trace Min |
| | Sodium Bicarbonate | Tricalcium Phosphate |

TABLE 6-continued

Exemplary Ingredients Suitable for
Use in Formulating Custom Feed Mixes

| | | |
|---|---|---|
| Poultry Blood Meal | Sodium Molybdate | Triticale |
| Poultry Byproduct | Sodium Sesquicarbonate | Tryptophan |
| Predispersed Clay | Sodium Sulfate | Tryptosine |
| Probios | Solulac | Tuna Offal Meal |
| Procain Penicillen | Soweena | Tylan |
| Propionic Acid | Soy Flour | Tylosin |
| Propylene Glycol | Soy Pass | Urea |
| Pyran Tart | Soy Protein Concentrate | Vegetable Oil Blend |
| Pyridoxine | Soybean Cake | Virginiamycin |
| Quest Anise | Soybean Curd By-Product | Vitamin A |
| Rabon | Soybean Dehulled Milk By-Product | Vitamin B Complex |
| Rapeseed Meal | | Vitamin B12 |
| Red Flavor | Soybean Hulls | Vitamin D3 |
| Red Millet | Soybean Mill Run | Vitamin E |
| Riboflavin | Soybean Oil | Walnut Meal |
| Rice Bran | Soybean Residue | Wheat Bran |
| Rice By-Products Fractions | Soybeans Extruded | Wheat Coarse Ground |
| | Soybeans-Roasted | Wheat Germ Meal |
| Rice Dust | Soycorn Extruded | Wheat Gluten |
| Rice Ground | Spray Dried Egg | Wheat Meal Shredded |
| Rice Hulls | Standard Micro Premix | Wheat Millrun |
| Rice Mill By-Product | Starch Molasses | Wheat Mix |
| Rice Rejects Ground | Steam Flaked Corn | Wheat Noodles Low Fat |
| Wheat Red Dog | | |
| Wheat Starch | | |
| Wheat Straw | | |
| Wheat With Enzyme | | |
| Wheat-Ground | | |
| Wheat-Rolled | | |
| Wheat-Whole | | |
| Whey Dried | | |
| Whey Permeate | | |
| Whey Protein Concentrate | | |
| Whey-Product Dried | | |
| Yeast Brewer Dried | | |
| Yeast Sugar Cane | | |
| Zinc | | |
| Zinc Oxide | | |
| Zoalene | | |

What is claimed is:

1. A system for determining customized feed for at least one animal, the system comprising:
   a first memory portion configured to store animal data representative of the characteristics of the animal;
   a second memory portion configured to store first feed data representative of the feed ingredients located at a first location;
   a third memory portion configured to store second feed data representative of the feed ingredients located at a second location;
   a fourth memory portion configured to store evaluation data representative of at least one evaluation criteria; and
   a data processing circuit in communication with the memory portions and configured to generate nutrient profile data representative of a nutrient profile for the animal based upon the animal data, the data processing circuit being further configured to generate ration data representative of a combination of ingredients from the first and second locations, the ration data being generated by the data processing circuit based upon the profile data, the first and second feed data and the evaluation data, wherein the nutrient profile data is representative of at least two nutrient components, and the system further includes a fifth memory portion in communication with the digital processor, the fifth memory portion storing variation data representative of a range for at least one nutrient component of the nutrient profile and the digital processor generates a set of ration data based upon the variation data.

2. The system of claim 1, wherein the animal data is representative of at least one of a beginning weight of the animal; a desired weight of the animal; an environment of the animal; a feed form; an actual or desired production level of the animal; and a relationship of animal muscle to fat of the animal.

3. The system of claim 2, wherein the feed ingredients include at least one of a grain source, a protein source, a vitamin source, a mineral source and a fat source.

4. The system of claim 1, wherein the evaluation data is representative of at least two evaluation criteria.

5. The system of claim 4, wherein the animal data is representative of at least one of a beginning weight of the animal; a desired weight of the animal; an environment of the animal; a feed form; an actual or desired production level of the animal; and a relationship of animal muscle to fat of the animal.

6. The system of claim 5, wherein the feed ingredients include at least one of a grain source, a protein source, a vitamin source, a mineral source and a fat source.

7. The system of claim 4, further comprising a memory portion in communication with the data processing circuit, the sixth memory portion being configured to store optimization weighting data representative of the effect a respective evaluation criteria has on the generation of the ration data, the data processing circuit further generating the ration data based upon the optimization weighting data.

8. The system of claim 7, wherein the optimization weighting data may be selected to cause one of the evaluation criteria to have no effect on the generation of the ration data.

9. The system of claim 1, wherein the memory portions are portions of a digital memory and a parallel data bus is coupled between the digital memory and the data processing circuit to facilitate communication therebetween.

10. The system of claim 1, wherein the memory portions are portions of a plurality of digital memories and a network couples the digital memories to the data processing circuit to facilitate communication therebetween.

11. The system of claim 1, wherein the nutrient components include at least true digestible lysine and net energy.

12. The system of claim 1, wherein the first and second feed data include an amount for each feed ingredient.

13. The system of claim 12, wherein the amount for each feed ingredient can be constrained according to one or more criteria.

14. The system of claim 13, wherein the amount of each feed ingredient can be constrained according to at least two criteria.

15. A system for determining customized feed for at least one animal, the system comprising:
   a first memory portion configured to store animal data representative of the characteristics of the animal;
   a second memory portion configured to store feed data representative of the feed ingredients located at at least one location;
   a third memory portion configured to store evaluation data representative of at least two evaluation criteria; and a data processing circuit in communication with the memory portions and configured to generate profile data representative of a nutrient profile for the animal based upon the animal data, the data processing circuit being further configured to generate ration data representative of a combination of ingredients from the location, the ration data being generated by the data processing circuit based upon the profile data, the feed data and the evaluation data, wherein the nutrient profile data is representative of at least two nutrient components, and the system further includes a fourth memory portion in communication with the digital processor, the fourth memory portion storing variation data representative of a range for at least one nutrient component of the nutrient profile and the digital processor generates a set of ration data based upon the variation data.

16. The system of claim 15, wherein the animal data is representative of at least one of a beginning weight of the animal; a desired weight of the animal; an environment of the animal; a feed form; an actual or desired production level of the animal; and a relationship of animal muscle to fat of the animal; and the feed ingredients include at least one of a grain source, a protein source, a vitamin source, a mineral source and a fat source.

17. The system of claim 15, further comprising a fifth memory portion in communication with the data processing circuit, the fifth memory portion being configured to store optimization weighting data representative of the effect a respective evaluation criteria has on the generation of the ration data, the data processing circuit further generating the ration data based upon the optimization weighting data.

18. The system of claim 17, wherein the optimization weighting data may be selected to cause one of the evaluation criteria to have no effect on the generation of the ration data.

19. The system of claim 15, wherein the nutrient components include at least true digestible lysine and net energy.

20. A system for determining customized feed for at least one animal, the system comprising:
first memory means for storing animal data representative of the characteristics of the animal;
second memory means for storing first feed data representative of the feed ingredients located at a first location;
third memory means for storing second feed data representative of the feed ingredients located at a second location;
fourth memory means for storing evaluation data representative of at least one evaluation criteria; and
processing means for generating profile data representative of a nutrient profile for the animal based upon the animal data, the processing means generating ration data representative of a combination of ingredients from the first and second locations, the ration data being generated by the processing means based upon the profile data, the first and second feed data and the evaluation data, wherein the nutrient profile data is representative of at least two nutrient components, and the system further includes fifth memory means for storing variation data representative of a range for at least one nutrient component of the nutrient profile and the processor means generating a set of ration data based upon the variation data.

21. The system of claim 20, wherein the animal data is representative of at least one of a beginning weight of the animal; a desired weight of the animal; an environment of the animal; a feed form; an actual or desired production level of the animal; and a relationship of animal muscle to fat of the animal; the feed ingredients include at least one of a grain source, a protein source, a vitamin source, a mineral source and a fat source.

22. The system of claim 20, wherein the evaluation criteria include at least two of (i) animal production rate, (ii) the cost of feed per unit animal weight gain, and (iii) the feed weight per unit animal weight gain.

23. The system of claim 22, wherein the feed ingredients include at least one of a grain source, a protein source, a vitamin source, a mineral source and a fat source.

24. The system of claim 20, wherein the evaluation data is representative of at least two evaluation criteria and wherein the system further comprises a sixth memory means in communication with the processing means, the sixth memory means being configured to store optimization weighting data representative of the effect a respective evaluation criteria has on the generation of the ration data, the processing means further generating the ration data based upon the optimization weighting data.

25. A system for determining customized feed for at least one animal, the system comprising:
first memory means for storing animal data representative of the characteristics of the animal;
second memory means for storing feed data representative of the feed ingredients located at at least one location;
third memory for storing evaluation data representative of at least two evaluation criteria; and
processing means for generating profile data representative of a nutrient profile for the animal based upon the animal data, processing means further generating ration data representative of a combination of ingredients from the location, the ration data being generated by the processing means based upon the profile data, the feed data and the evaluation data, wherein the nutrient profile data is representative of at least two nutrient components, and the system further includes a fourth memory means for storing variation data representative of a range for at least one nutrient component of the nutrient profile; and the processing means generates a set of ration data based upon the variation data.

26. The system of claim 25, wherein the animal data is representative of at least one of a beginning weight of the animal; a desired weight of the animal; an environment of the animal; a feed form; an actual or desired production level of the animal; and a relationship of animal muscle to fat of the animal; and wherein the feed ingredients include at least one a grain source, a protein source, a vitamin source, a mineral source and a fat source.

27. The system of claim 26, wherein the evaluation criteria include at least two of (i) animal production rate, (ii) the cost of feed per unit animal weight gain, and (iii) the feed weight per unit animal weight gain.

28. The system of claim 25, further comprising fifth memory means for storing optimization weighting data representative of the effect a respective evaluation criteria has on the generation of the ration data, the processing means further generating the ration data based upon the optimization weighting data.

29. A method for determining customized feed for at least one animal, the method comprising:
storing animal data representative of the characteristics of the animal;
storing first feed data representative of the feed ingredients located at a first location;

storing second feed data representative of the feed ingredients located at a second location;

storing evaluation data representative of at least two evaluation criteria;

generating profile data representative of a nutrient profile for the animal based upon the animal data;

generating first ration data representative of a combination of ingredients from the first location, second ration data representative of a combination of ingredients from the second locations, the ration data being generated based upon the profile data, the first and second feed data and the evaluation data, wherein the nutrient profile data is representative of at least two nutrient components, the method further comprising the step of generating a set of ration data based upon variation data representative of a range for at least one nutrient component of the nutrient profile; and storing optimization weighting data representative of the effect a respective evaluation criteria has on the generation of the ration data and generation the ration data further based upon the optimization weighting data.

30. The method of claim 29, including storing evaluation data representative of at least two evaluation criteria and further including storing optimization weighting data representative of the effect a respective evaluation criteria has on the generation of the ration data and generating the ration data further based upon the optimization weighting data.

31. A method for determining customized feed for at least one animal, the method comprising:

storing animal data representative of the characteristics of the animal;

storing feed data representative of the feed ingredients located at at least one location;

storing evaluation data representative of at least two evaluation criteria;

generating profile data representative of a nutrient profile for the animal based upon the animal data;

generating ration data representative of a combination of ingredients from the location, the ration data being generated based upon the profile data, the feed data and the evaluation data, wherein the nutrient profile data is representative of at least two nutrient components of the nutrient profile, and the method generates a set of ration data based upon variation data representative of a range for at least one nutrient component; and storing optimization weighting data representative of the effect a respective evaluation criteria has on the generation of the ration data and generating the ration data further based upon the optimization weighting data.

32. The method of claim 31, including storing optimization weighting data representative of the effect a respective evaluation criteria has on the generation of the ration data and generating the ration data further based upon the optimization weighting data.

33. A customized feed for an animal, the feed produced by a process comprising:

storing animal data representative of the characteristics of the animal;

storing first feed data representative of the feed ingredients located at a first location;

storing second feed data representative of the feed ingredients located at a second location;

storing evaluation data representative of at least one evaluation criteria;

generating nutrient profile data representative of a nutrient profile for the animal based upon the animal data;

generating first ration data representative of a combination of ingredients from the first location and second ration data representative of ingredients from the second location, each ration data being generated based upon the profile data, the first or second feed data, respectively, and the evaluation data; and generating a set of ration data based upon variation data representative of a range for at least one nutrient component of the nutrient profile, wherein the nutrient profile data is representative of at least two nutrient components.

34. The process of claim 33, further comprising mixing the combination of ingredients and feeding the feed to the livestock.

35. The customized feed of claim 33, wherein the process for producing the feed further includes storing evaluation data representative of at least two evaluation criteria and storing optimization weighting data representative of the effect a respective evaluation criteria has on the generation of the ration data and generating the ration data further based upon the optimization weighting data.

36. A customized feed for livestock, the feed produced by a process comprising:

storing animal data representative of the characteristics of the animal;

storing feed data representative of the feed ingredients located in at least one location;

storing evaluation data representative of at least two evaluation criteria;

generating profile data representative of a nutrient profile for the animal based upon the animal data; and generating ration data representative of a combination of the feed ingredients, the ration data being generated based upon the profile data, the feed data and the evaluation data, wherein the nutrient profile data is representative of at least two nutrient components and the process further comprises the step of generating a set of ration data based upon variation data representative of a range for at least one nutrient component of the nutrient profile.

37. The customized feed of claim 36, wherein the process for producing the feed further includes storing optimization weighting data representative of the effect a respective evaluation criteria has on the generation of the ration data and generating the ration data further based upon the optimization weighting data.

38. A customized feed for livestock, the feed produced by a process comprising:

storing animal data representative of the characteristics of the animal;

storing feed data representative of the feed ingredients located in at least one location;

storing evaluation data representative of at least two evaluation criteria;

generating profile data representative of a nutrient profile for the animal based upon the animal data generating ration data representative of a combination of the feed ingredients, the ration data being generated based upon the profile data, the feed data and the evaluation data, wherein the nutrient profile data is representative of at least two nutrient components and the process further comprises the step of generating a set of ration data based upon variation data representative of a range for at least one nutrient component of the nutrient profile; and mixing the combination of ingredients and feeding the feed to the livestock.

39. A customized feed for livestock, the feed produced by a process comprising:

storing animal data representative of the characteristics of the animal;

storing feed data representative of the feed ingredients located in at least one location;

storing evaluation data representative of at least two evaluation criteria;

generating profile data representative of a nutrient profile for the animal based upon the animal data; and generating ration data representative of a combination of the feed ingredients, the ration data being generated based upon the profile data, the feed data and the evaluation data, wherein the ration data comprises custom feed data representative of a combination of amounts of the feed ingredients, wherein the nutrient profile data is representative of at least two nutrient components and the process further comprises the step of generating a set of ration data based upon variation data representative of a range for at least one nutrient component of the nutrient profile, and wherein the ration data further comprises cost data representative of a cost associated with the custom feed data.

40. A customized feed for livestock, the feed produced by a process comprising:

storing animal data representative of the characteristics of the animal;

storing feed data representative of the feed ingredients located in at least one location;

storing evaluation data representative of at least two evaluation criteria;

generating profile data representative of a nutrient profile for the animal based upon the animal data; and generating ration data representative of a combination of the feed ingredients, the ration data being generated based upon the profile data, the feed data and the evaluation data, wherein the ration data comprises custom feed data representative of a combination of amounts of the feed ingredients, wherein the nutrient profile data is representative of at least two nutrient components and the process further comprises the step of generating a set of ration data based upon variation data representative of a range for at least one nutrient component of the nutrient profile, and wherein the ration data further comprises feed weight data representative of a feed weight associated with the custom feed data.

41. A customized feed for livestock, the feed produced by a process comprising:

storing animal data representative of the characteristics of the animal;

storing feed data representative of the feed ingredients located in at least one location;

storing evaluation data representative of at least two evaluation criteria;

generating profile data representative of a nutrient profile for the animal based upon the animal data; and generating ration data representative of a combination of the feed ingredients, the ration data being generated based upon the profile data, the feed data and the evaluation data, wherein the ration data comprises custom feed data representative of a combination of amounts of the feed ingredients, wherein the nutrient profile data is representative of at least two nutrient components and the process further comprises the step of generating a set of ration data based upon variation data representative of a range for at least one nutrient component of the nutrient profile, and wherein the ration data further comprises performance data representative of a projected animal performance associated with the custom feed data.

42. A food product from an animal fed a customized feed, the food product produced by a process comprising:

storing animal data representative of the characteristics of the animal;

storing first feed data representative of the feed ingredients located at a first location;

storing second feed data representative of the feed ingredients located at a second location;

storing evaluation data representative of at least one evaluation criteria;

generating profile data representative of a nutrient profile for the animal based upon the animal data;

generating ration data representative of a combination of ingredients from the first and second locations, the ration data being generated based upon the profile data, the first and second feed data and the evaluation data, wherein the nutrient profile data is representative of at least two nutrient components, the process further comprising the step of generating a set of ration data based upon variation data representative of a range for the nutrient components of the nutrient profile;

mixing the combination of ingredients to produce the customized feed;

feeding the customized feed to the animal; and processing the animal to generate said food product.

43. The food product of claim 42, wherein the process for producing the food product further includes storing evaluation data representative of at least two evaluation criteria and storing optimization weighting data representative of the effect a respective evaluation criteria has on the generation of the ration data and generating the ration data further based upon the optimization weighting data.

44. A food product from an animal fed a customized feed, the food product produced by a process comprising:

storing animal data representative of the characteristics of the animal;

storing feed data representative of the feed ingredients located at at least one location;

storing evaluation data representative of at least two evaluation criteria;

generating profile data representative of a nutrient profile for the animal based upon the animal data;

generating ration data representative of a combination of ingredients from the first and second locations, the ration data being generated based upon the profile data, the first and second feed data and the evaluation data, wherein the nutrient profile data is representative of at least two nutrient components, the process further comprising the step of generating a set of ration data based upon variation data representative of a range for the nutrient components of the nutrient profile;

mixing the combination of ingredients to produce the customized feed;

feeding the customized feed to the animal; and processing the animal to generate said food product.

45. The food product of claim 44, wherein the process for producing the food product further includes storing optimization weighting data representative of the effect a respective evaluation criteria has on the generation of the ration data and generating the ration data further based upon the optimization weighting data.

* * * * *